United States Patent
Verrelst et al.

(10) Patent No.: US 12,247,584 B2
(45) Date of Patent: Mar. 11, 2025

(54) MULTISTAGE CENTRIFUGAL COMPRESSOR

(71) Applicant: ATLAS COPCO AIRPOWER, NAAMLOZE VENNOOTSCHAP, Wilrijk (BE)

(72) Inventors: Bjorn Verrelst, Wilrijk (BE); Nils Vercauteren, Wilrijk (BE); Hans Meeus, Wilrijk (BE); Smail El Bejjati, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 0 days.

(21) Appl. No.: 18/025,291

(22) PCT Filed: Oct. 1, 2021

(86) PCT No.: PCT/IB2021/059046
§ 371 (c)(1),
(2) Date: Mar. 8, 2023

(87) PCT Pub. No.: WO2022/084777
PCT Pub. Date: Apr. 28, 2022

(65) Prior Publication Data
US 2023/0323898 A1    Oct. 12, 2023

(30) Foreign Application Priority Data
Oct. 19, 2020    (BE) .................................. 2020/5728

(51) Int. Cl.
*F04D 29/66*    (2006.01)
*F04D 17/12*    (2006.01)
(Continued)

(52) U.S. Cl.
CPC ......... *F04D 29/668* (2013.01); *F04D 17/122* (2013.01); *F04D 29/059* (2013.01);
(Continued)

(58) Field of Classification Search
CPC .... F04D 17/122; F04D 29/059; F04D 29/668; F16C 27/066; F16C 2360/44; F16F 15/0237
See application file for complete search history.

(56) References Cited

U.S. PATENT DOCUMENTS 5,603,574 A * 2/1997 Ide .................. F16C 17/065
    384/119
5,755,554 A * 5/1998 Ryall .............. F04D 29/544
    415/199.5
(Continued)

FOREIGN PATENT DOCUMENTS

DE    102009004774 B3 * 10/2010 ......... B29C 45/1459
DE    202018001170 U1    6/2019
(Continued)

OTHER PUBLICATIONS

JP-2011144924-A (Ohira et al.; Jul. 28, 2011) English Translation. (Year: 2023).*
(Continued)

*Primary Examiner* — David E Sosnowski
*Assistant Examiner* — Aye S Htay
(74) *Attorney, Agent, or Firm* — BACON&THOMAS,PLLC

(57) ABSTRACT

Multistage centrifugal compressor provided with a shaft with blades, which is mounted in a housing with bearings. At least one bearing is provided with a bearing damper element including a ring arranged between the shaft and the bearing. The ring includes slots through the thickness of the ring in the axial direction (X-X') and at a distance from the radially-
(Continued)

directed inner and outer surface of the ring. The slots are at least partially overlapping, and:
  A) the slots are filled with a liquid, and the axial annular surfaces are closed off by means of a protective cap;
  or:
  B) at least one of the annular surfaces is provided with a viscoelastic material or hysteretic damping material sandwiched between two concentric discs, which discs are attached to the ring;
  or:
  C) the slots are filled with a viscoelastic material.

14 Claims, 4 Drawing Sheets

(51) Int. Cl.
  *F04D 29/059* (2006.01)
  *F16C 27/06* (2006.01)
(52) U.S. Cl.
  CPC ........ *F16C 27/066* (2013.01); *F05D 2260/96* (2013.01); *F16C 2360/44* (2013.01)

(56) References Cited

U.S. PATENT DOCUMENTS

| 8,418,368 | B2 | 4/2013 | Horling et al. |
| 2009/0263057 | A1* | 10/2009 | Kanki ...................... B23H 9/00 384/99 |
| 2011/0002571 | A1 | 1/2011 | Horling et al. |
| 2015/0104123 | A1* | 4/2015 | Ertas ...................... F01D 25/164 384/119 |
| 2022/0056952 | A1* | 2/2022 | Ishimaru ............. F16F 15/0235 |

FOREIGN PATENT DOCUMENTS

| EP | 2187072 | A1 |   | 5/2010 |
| EP | 2378156 | A1 |   | 10/2011 |
| JP | 2001-50267 | A |   | 9/2002 |
| JP | 2009281278 | A |   | 12/2009 |
| JP | 2011144924 | A | * | 7/2011 |
| JP | 2015124838 | A |   | 7/2015 |
| JP | 2020-525728 | A |   | 8/2020 |
| WO | 2019002959 | A1 |   | 1/2019 |

OTHER PUBLICATIONS

DE-102009004774-B3 (Horling et al. ; Oct. 7, 2010) English Translation. (Year: 2023).*
International Search Report and Written Opinion in corresponding PCT Application No. PCT/IB2021/059046, dated Nov. 18, 2021.
International Preliminary Examining Authority in corresponding PCT Application No. PCT/IB2021/059046, dated Sep. 26, 2022.
Translation of OA cited in corresponding Japanese Patent Appln. No. 2023-524141 dated Sep. 17, 2024.
OA cited in corresponding South Korean Appln. No. 10-2023-7016990 dated Dec. 10, 2024.

* cited by examiner

MULTISTAGE CENTRIFUGAL COMPRESSOR

BACKGROUND OF THE INVENTION

It is known that in such compressors several blades, which form the different stages of the compressor, are mounted on a shaft, which shaft is journaled in a housing.

Usually, roller bearings are used for these machines because the typical rotational speed, 50 Hz or 60 Hz, is not too high.

The maximum number of blades on the shaft, i.e. the maximum number of stages, and the maximum speed at which the blades can rotate are determined by the rotor dynamics. More specifically, the first critical lateral speed constitutes an absolute upper limit for the rotational speed.

If the mass is too large or the shaft is too long, resonance problems may arise, with the generated vibrations approaching the natural frequency, which can never be exceeded. This problem mainly occurs with rolling bearings and to a lesser extent with plain or liquid bearings. The lack of sufficient damping to exceed the critical speed is the main reason for the limitation.

Hence, there is a limitation in speed and number of possible blades, i.e. stages, by the dynamics and resonance problems resulting thereof.

The maximum number of stages in the known multistage centrifugal compressors is limited to a variable number, depending on the power variant.

To solve resonance problems, thin-film dampers or so-called "squeeze film dampers" are already known.

These are based on the damping effect of a liquid, usually oil, in a thin gap.

Such thin film dampers are known from, for example, WO 2019/002959.

Such known dampers have the drawback that an oil supply to the thin film dampers must be present.

This means that, to achieve this oil supply, an oil circuit, oil reservoir and oil pump must be present.

Since the known multistage centrifugal compressors on roller bearings in most cases do not have an oil pump or the like, after all: the bearings are usually grease-lubricated or are lubricated by the principle of "splash oil lubrication", the use of such dampers means an additional cost and a more voluminous and more complex machine.

Therefore, such dampers are not used in the known multistage centrifugal compressors and therefore these are limited in terms of speed and the number of stages.

SUMMARY OF THE INVENTION

The present invention aims to provide a solution to at least one of said and other drawbacks.

To this end, the invention concerns a multistage centrifugal compressor provided with a shaft with a plurality of blades thereon, wherein the shaft is mounted in a housing by means of bearings, characterised in that at least one bearing is provided with a bearing damper element consisting of a ring arranged between the shaft or the housing and said bearing, wherein the ring comprises slots through the thickness of the ring in the axial direction and at a distance from the radially-directed inner and outer surface of the ring, wherein the slots are at least partially overlapping, wherein:

A) said slots are filled with a liquid, wherein the axial annular surfaces of the ring are closed off by means of a protective cap;
or:

B) at least one of both axial annular surfaces of the ring is provided with a viscoelastic material or hysteretic damping material sandwiched between two concentric disks or the like, which disks are attached to the ring; or:

C) said slots are filled with a viscoelastic material.

The construction of the slots forms a radial spring mechanism. The spring constant of this mechanism determines the location of the critical speed. This is selected somewhere in the rotational speed range of the machine. To exceed the critical speed with limited dynamic amplification, i.e. vibrations, damping is added to this resilient element through one of said options A, B or C.

By 'overlap' here is meant that a line starting from the midpoint or centre of the ring and intersecting the ring, will intersect the respective slots.

By 'slot' here is meant a slot, slit, cut or the like, wherein it is important that these slots extend through the entire thickness of the ring in an axial direction.

It is an advantage that a bearing damper element is created, for which there is no need for liquid injection in the slots and therefore for an associated liquid circuit, liquid pump or liquid reservoir.

The bearing damper element can therefore be easily applied in a multistage centrifugal compressor.

By applying the bearing damper element, said resonance problems can be avoided, allowing the machine to rotate faster and/or be provided with additional stages by placing extra blades on the shaft.

Although for option A there is liquid present in the slots, this liquid should not be continuously replenished as the protective caps will keep the liquid in the slots.

Herein, it is not excluded that a space is present between the protective cap and the axial annular surfaces of the ring, which is filled with the liquid.

The protective cap may be designed in different ways and is preferably manufactured from an elastomer, such as, for instance, a rubber.

For example, the protective cap may be a 3D printed structure, which has some flexibility, or may be a thin-walled protective cap provided with a harmonica-structure.

However, it should be clear that many different variants are possible.

For option B, the viscoelastic material, such as, for example, rubber, or hysteretic damping material, such as, for example, metal gauze, is arranged in parallel with the ring by means of two concentric discs or the like.

Also in this case, the concentric discs can be embodied in different ways, but in the simplest embodiment they are two flat, planar discs which can be fixed to the ring, for example by means of screws or bolts.

It is hereby possible to provide to the axial, annular surface, on one side of the ring or on both sides of the ring, such concentric discs with the viscoelastic material or hysteretic damping material in between them.

The viscoelastic material may be, for example, an O-ring, the hysteretic damping material, for example, metal gauze ("wire metal mesh").

It is important to note that in this case, liquid is normally not required if the damping is sufficient, but it can still be combined with the presence of liquid in a small clearance to increase the damping. In this way, an oil damping is combined with a rubber seal.

Also for option C, no liquid is present. The viscoelastic material provided in the slots is preferably rubber attached into the slots through vulcanization.

The slots are preferably completely filled with viscoelastic material.

BRIEF DESCRIPTION OF THE DRAWINGS

With the aim to better illustrate the characteristics of the invention, hereafter, as an example without any limitative character, several preferred embodiments of a multistage centrifugal compressor according to the present invention are described, with reference to the accompanying drawings, in which.

DETAILED DESCRIPTION OF THE INVENTION

Figure 1:
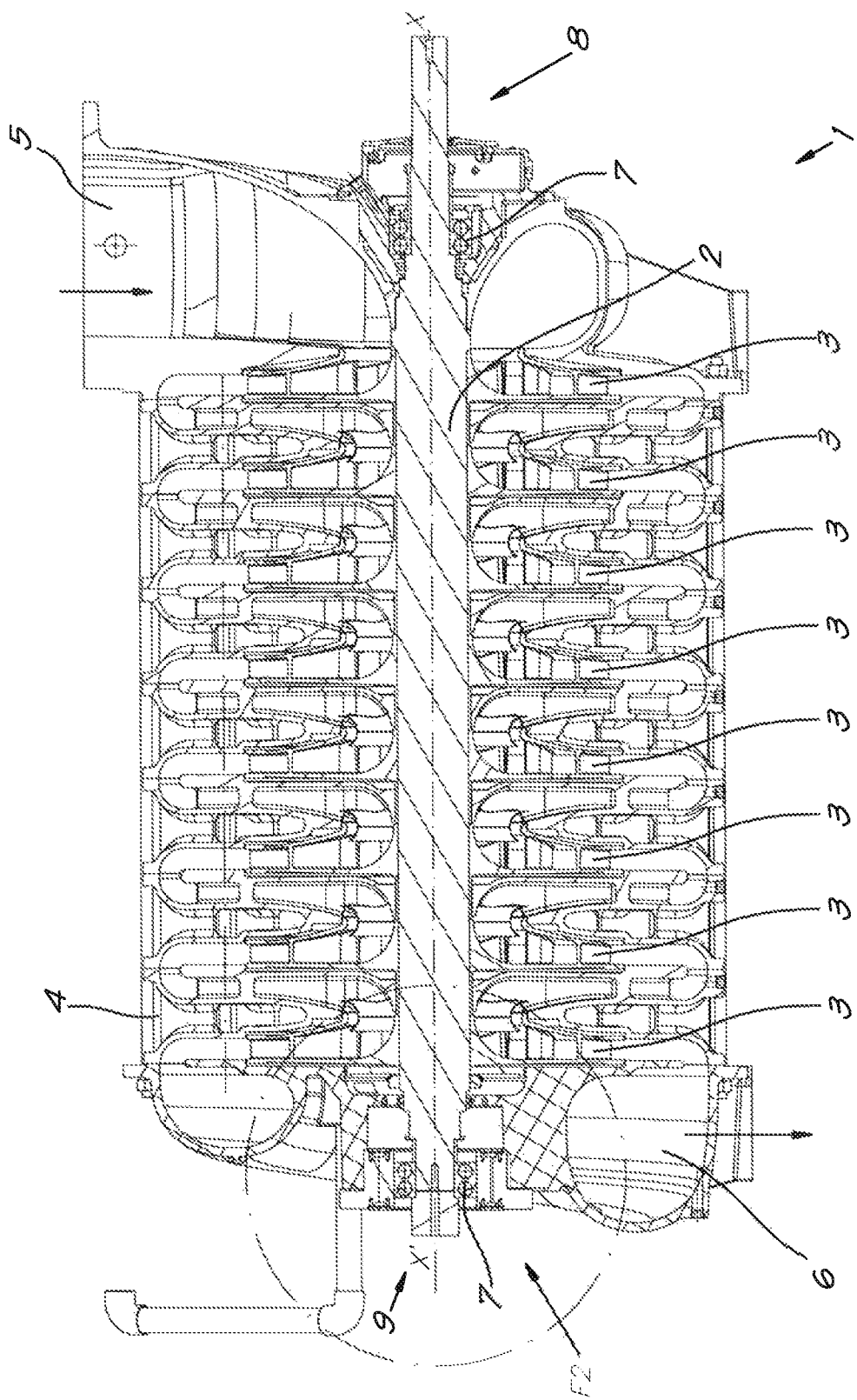
FIG. 1 schematically shows a multistage centrifugal compressor according to the invention.

In FIG. 1 is schematically shown a multistage centrifugal compressor 1 according to the invention.

It essentially comprises a shaft 2 with a plurality of blades 3 thereon, wherein the shaft 2 is rotatably mounted in a housing 4.

In this case eight blades 3 are present, but it is not excluded that more than eight or even more than ten blades 3 are present.

As is known, the housing 2 is provided with an inlet opening 5 and an outlet opening 6.

The shaft 2 is journaled on both sides by means of bearings 7.

In this case, the bearings 7 are rolling bearings 7, and in particular double row deep groove ball bearings.

One end 8 of the shaft 2 is the driven end 8, i.e. a drive, for instance in the form of a motor, is connected thereto to enable the shaft 2 to rotate. The drive is not shown in the figures.

The other end 9 of the shaft 2 is the non-driven end 8.

According to the invention, at least one bearing 7 is provided with a bearing damper element 10.

In this case, but not necessary for the invention, the bearings 7 are provided at only one end 9 of the shaft 2 with a bearing damper element 10.

In this case, this concerns the non-driven end 9 of the shaft 2.

This has the advantage that maintenance of the bearing damper element 10 is much simpler.

Of course, it is not excluded that the bearings 7 are provided with a bearing damper element 10 at both ends 8, 9 of the shaft 2.

Figure 2:
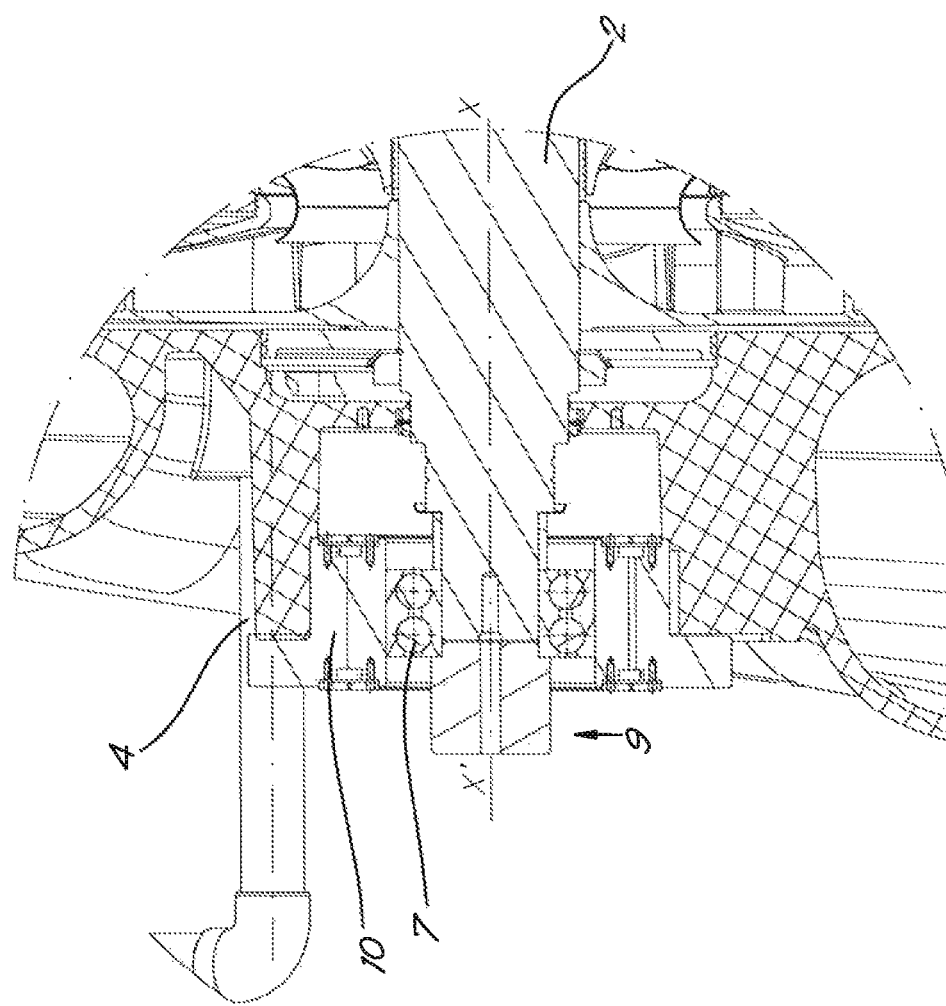
FIG. 2 shows a practical embodiment of the part indicated by F2 in FIG. 1.

In FIG. 2 is shown the respective bearing 7 on the non-driven end 9 of the shaft with the bearing damper element 10.

According to the invention, the bearing damper element 10 consists of a ring 11, which is arranged between the housing 4 and the respective bearing 7. Of course, it is not excluded that the bearing damper element 10 is arranged between the shaft 2 and the bearing 7.

Figure 3:
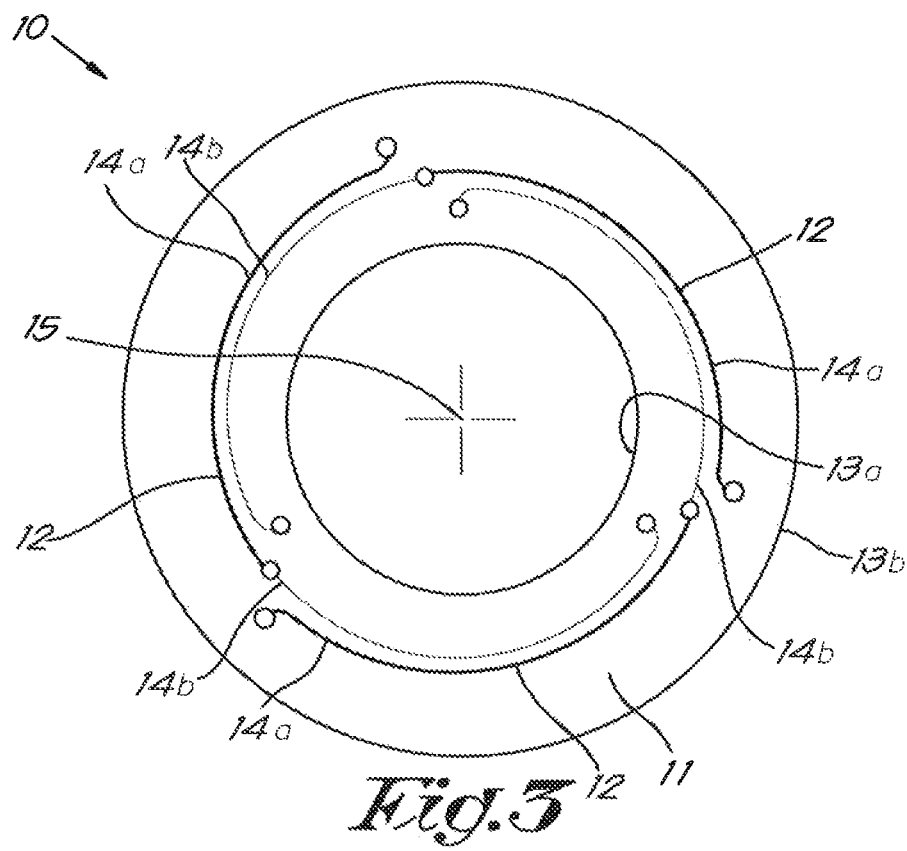
FIG. 3 shows a practical embodiment of the ring of a bearing damper element from FIG. 2.

This ring 11 is shown in detail in FIG. 3.

The ring 11 comprises a plurality of slots 12 through the thickness of the ring 11 in the axial direction X-X' and spaced from the radially-directed inner and outer surfaces 13a, 13b of the ring 11.

There are preferably at least three slots 12, wherein at least half of the slots 12 has one or more damping portions 14a with a maximum width of 0.5 millimetre, preferably maximum 0.2 millimetre and more preferably maximum 1.15 millimetre.

The damping portions 14a are preferably concentric and non-overlapping.

These damping portions 14a preferably surround more than 80% and more preferably more than 90% of the centre or midpoint 15 of the ring.

In addition to the damping portions 14a, preferably at least one slot 12 also has one or more spring portions 14b with a minimum width greater than the width of preferably at least 0.5 millimetre.

The spring portions 14b are preferably at least twice and more preferably at least three times wider than the width of the damping portions 14a.

According to the invention, the slots 12 are at least partially overlapping.

As already mentioned, by 'overlapping slots' here is meant that a line starting from the midpoint or centre of the ring 11 and intersecting the ring 11, will intersect the respective slots 8.

By "at least partially" is meant that the slots 12 overlap for at least a portion of their length, but not necessarily for their entire length.

Preferably, the spring portions 14b of the slots 12 overlap at least partially with the damping portions 14a.

Also, the damping portions 14a are preferably further from the centre or midpoint 15 of the ring 11 than the spring portions 14b.

Another embodiment of the ring 11 may also comprise slots 12 with only damping portions 14a or with only spring portions 14b. The embodiment with only damping portions 14a will preferably be applied with said option A, as explained below, thereby creating a "squeeze film" effect. In the case of said options B and C, such thin damping portions 14a are of little use since the damping is realized parallel to the slots 12. In this case, the embodiment will preferably be used in which the slots 12 have only spring portions 14b, which will mainly have a resilient effect.

The narrower or thinner damping portions 14a are preferably fabricated through a wire spark process such as 'EDM' or 'electrical discharge machining'.

The wider spring portions 14b can be manufactured using a water jet or a milling process.

Figure 4:
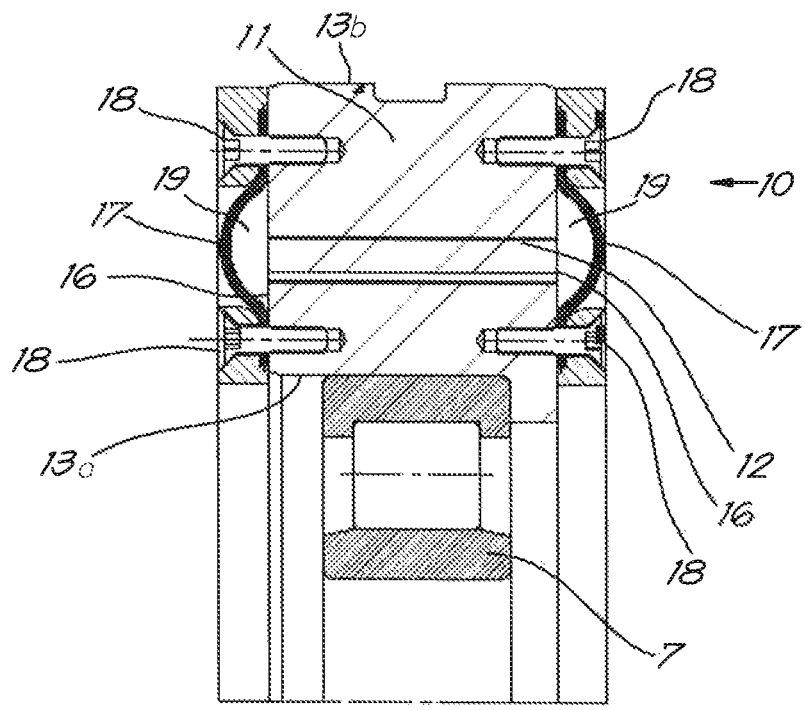
FIG. 4 shows in more detail the bearing damper element of FIG. 2.
Figure 5:
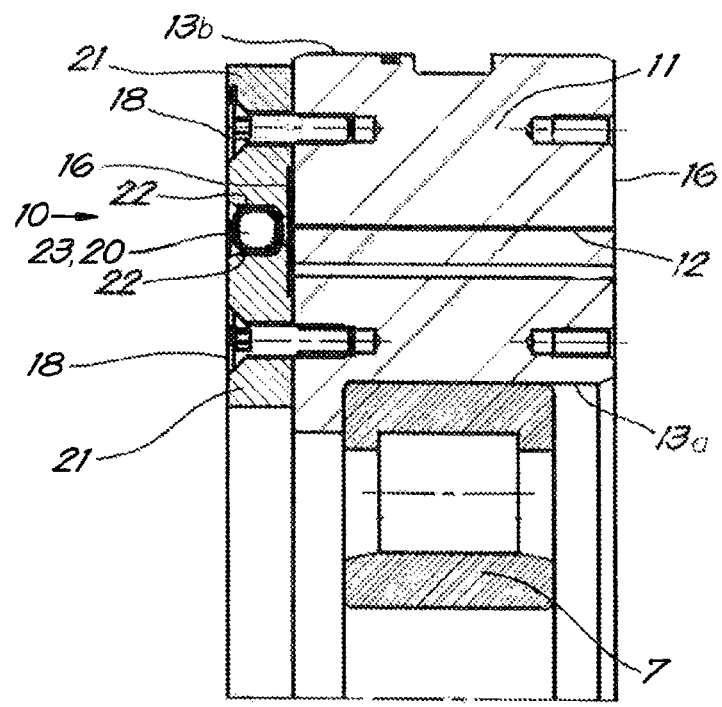
FIGS. 5 and 6 show two variants of FIG. 4.
Figure 6:
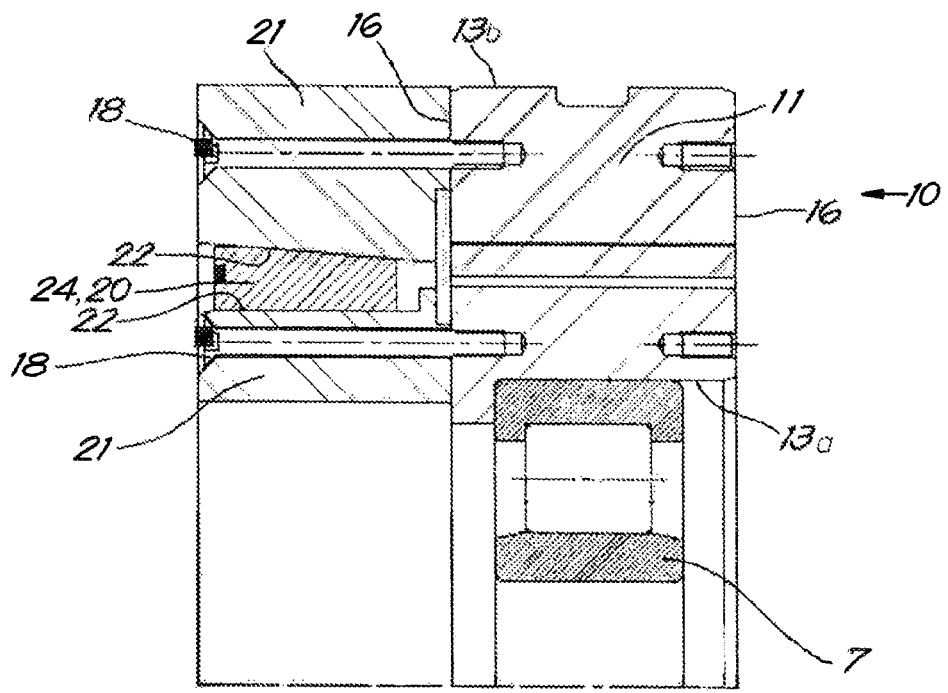

For the further implementation of the bearing damper element 10, there are several options according to the invention, which are shown in the FIGS. 4 to 6.

A first option A according to the invention, as shown in FIG. 4, concerns an embodiment wherein said slots 12 are filled with a liquid. This liquid has viscous properties and is, for example, but not necessarily, oil.

The axial annular surfaces 16 of the ring 11 are closed off by means of a protective cap 17.

In the example shown, the protective caps 17 are manufactured from an elastomer, for example from rubber.

The protective caps 17 are fastened to the axial annular surfaces 16 of the ring 11 by means of bolts or screws 18.

Of course, other fastening methods are also possible, as long as they do not block the resilient action, and therefore also the damping.

A space 19 is present between the protective caps 17 and the axial annular surfaces 16 of the ring which is filled with the liquid.

Alternatively, the protective caps 17 may be a 3D printed structure, which has some flexibility.

This means that the protective cap 17, due to its structure, is flexible or deformable.

It is known that by means of 3D printing, complex structures and shapes are possible, such that a structure with the necessary flexibility can be created.

For instance, the protective cap 17 can be a thin-walled protective cap 17, which is provided with a harmonica-structure. Such a harmonica-structure is, as is known, flexible and deformable.

A second option B according to the invention, as shown in FIGS. 5 and 6, concerns an embodiment in which at least one of the two axial annular surfaces 16 of the ring 11 is provided with a viscoelastic material 20 or hysteretic damping material 20 that is sandwiched between two concentric discs 21 or the like, which discs 21 are attached to the ring 11.

The discs 21, like the protective caps 17, may be fastened with bolts or screws 18 or in some other way.

The discs 21 can be embodied in many different forms.

In FIGS. 5 and 6, they possess a slightly profiled radial inner or outer surface 22, to be able to contain the viscoelastic material 20 or the hysteretic damping material 20.

For option B, it is not necessary for liquid to be present in the slots 12.

Said viscoelastic material 20 may be an O-ring 23, as shown in FIG. 5, while said hysteretic damping material 20 may be a metal gauze 24 (or "wire metal mesh"), as shown in FIG. 6.

Although in FIGS. 5 and 6 the concentric discs 21 with the viscoelastic material 20 or hysteretic damping material 20 are attached only on one side of the ring 11, it is not excluded that both axial annular surfaces 16 of the ring 11 are provided with a viscoelastic material 20 or hysteretic damping material 20.

A third option C, which is not shown in the figures, concerns an embodiment in which said slots are 12 filled with a viscoelastic material.

This viscoelastic material is, for example, a rubber, which is attached into the slots 12 through vulcanization.

The slots 12 have only spring portions 14b.

The advantage of such an embodiment is that no protective cap 17 or concentric discs 21 have to be attached to the ring 11.

The operation of the multistage centrifugal compressor 1 is very simple and as follows.

During the operation of the centrifugal compressor 1, the drive will cause the shaft 2 to rotate, as a result of which the blades 3 will suck in air through the inlet opening 5, which is compressed in successive steps, and then leave the centrifugal compressor 1 through the outlet opening 6.

During operation, vibrations will be generated, which should be damped to ensure that no resonance problems will arise.

The bearing damper element 10 will damp these vibrations.

In the situation of FIG. 4, the liquid in the slots 12 will create thin film dampers, which will provide for the damping.

The protective caps 17 keep the liquid in the slots 12 such that no liquid can flow out and because they are made of an elastomer, they will be moving along when the ring 11 deforms under the action of the vibrations.

For option B, as shown in FIGS. 5 and 6, the viscoelastic material 20 or the hysteretic damping material 20 will deform to dampen the vibrations, with the ring 11, as before, providing some flexibility.

In case of option C, the thicker spring portions 14b will be vulcanized, wherein the viscoelastic material in the slots 12 will have the same function as the liquid in the slots 12 of the embodiment of FIG. 4.

Due to the damping of the vibrations by the bearing damper element 10, the resonance problems will be avoided. This will allow the centrifugal compressor 1 to rotate faster and/or to add more stages.

The present invention is by no means limited to the embodiments described as example and shown in the drawings, but a multistage centrifugal compressor according to the invention can be realized a variety of forms and dimensions without departing from the scope of the invention.

The invention claimed is:

1. A multistage centrifugal compressor provided with a shaft with a plurality of blades thereon, wherein the shaft is mounted in a housing by bearings, wherein at least one bearing is provided with a bearing damper element comprising a ring arranged between the shaft or the housing and said bearing,
   wherein the ring comprises slots through a thickness of the ring in an axial direction and at a distance from radially-directed inner and outer surfaces of the ring, wherein the slots are at least partially overlapping,
   wherein at least one axial annular surface of the ring is provided with two concentric discs each having a planar surface in contact with the axial annular surface of the ring, an outer one of the two concentric discs having an inner peripheral surface that faces an outer peripheral surface of an inner one of the two concentric discs,
   wherein a viscoelastic material or hysteretic damping material is sandwiched between and in contact with the inner peripheral surface of the outer one of the two concentric discs and the outer peripheral surface of the inner one of the two concentric discs, and
   wherein the viscoelastic material comprises an O-ring or the hysteretic damping material comprises a metal wire mesh.

2. The multistage centrifugal compressor according to claim 1, wherein the slots are filled with a liquid.

3. The multistage centrifugal compressor according to claim 1, wherein both axial annular surfaces of the ring are provided with the viscoelastic material or hysteretic damping material.

4. The multistage centrifugal compressor according to claim 1, wherein the bearings are rolling bearings.

5. The multistage centrifugal compressor according to claim 1, wherein said at least one bearing is provided at only one end of the shaft with said bearing damper element.

6. The multistage centrifugal compressor according to claim 5, wherein the bearing damper element is located on a non-driven end of the shaft.

7. The multistage centrifugal compressor according to claim 1, wherein the ring comprises at least three slots.

8. The multistage centrifugal compressor according to claim 1, wherein the slots have damping portions with a maximum width of 0.5 millimetre.

9. The multistage centrifugal compressor according to claim 1, wherein the slots have spring sections with a minimum width of 0.5 millimetre.

10. The multistage centrifugal compressor according to claim 1, wherein there are more than ten blades on the shaft.

11. The multistage centrifugal compressor according to claim 8, wherein the slots have damping portions with a maximum width of 0.2 millimetre.

12. The multistage centrifugal compressor according to claim 11, wherein the slots have damping portions with a maximum width of 1.15 millimetre.

13. The multistage centrifugal compressor according to claim 2, wherein the liquid is oil.

14. The multistage centrifugal compressor according to claim 2, wherein said slots are filled with a viscoelastic material.

* * * * *